Aug. 23, 1927.
G. W. DUNCAN
1,639,688
WELDING TOOL
Filed Nov. 10, 1925
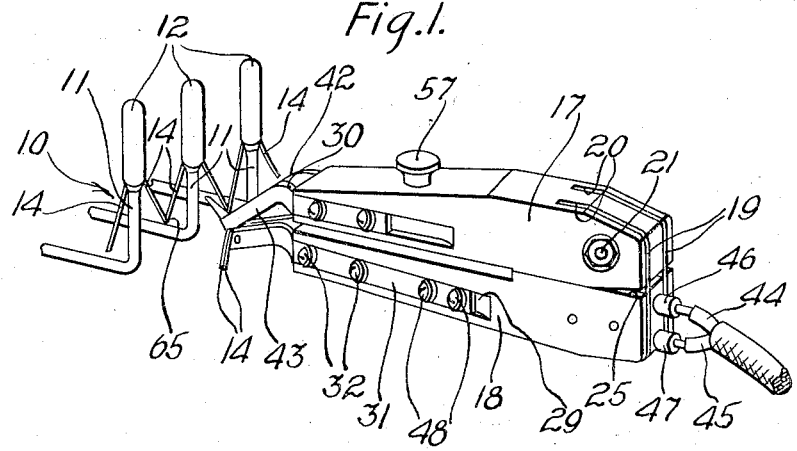
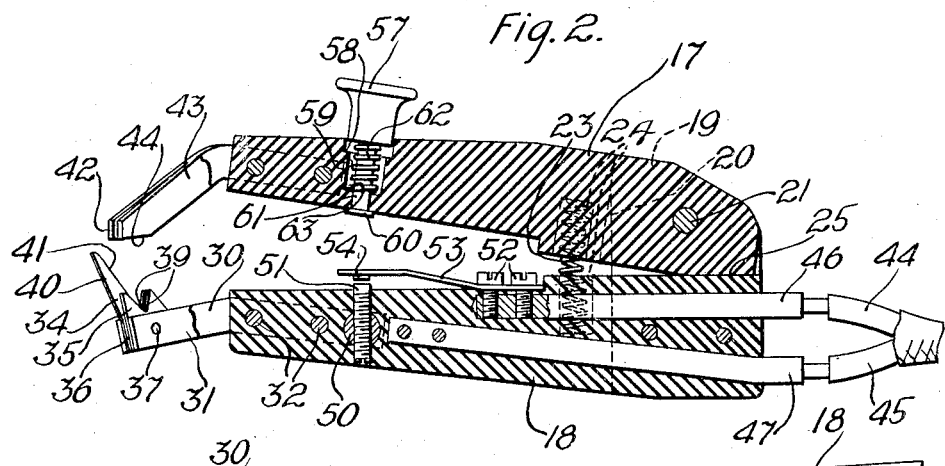
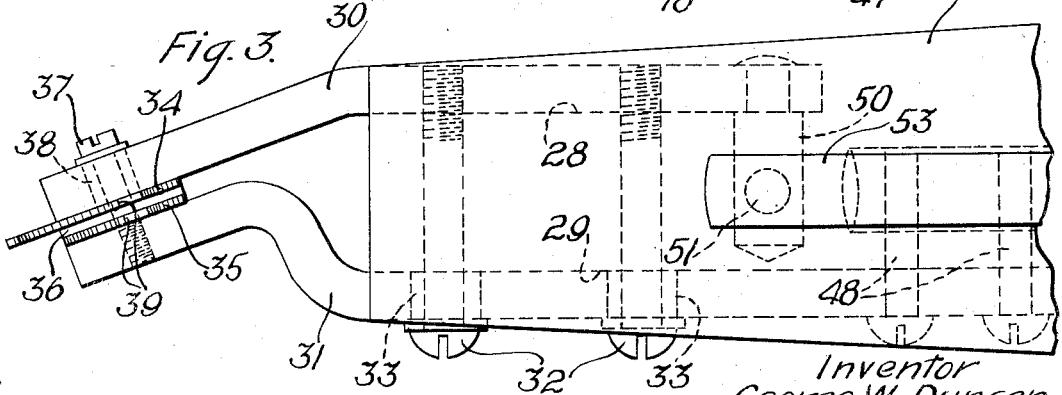
Inventor
George W. Duncan
by N. Y. Satterm Atty.

Patented Aug. 23, 1927.

1,639,688

UNITED STATES PATENT OFFICE.

GEORGE WILLIAM DUNCAN, OF CHICAGO, ILLINOIS, ASSIGNOR TO WESTERN ELECTRIC COMPANY, INCORPORATED, OF NEW YORK, N. Y., A CORPORATION OF NEW YORK.

WELDING TOOL.

Application filed November 10, 1925. Serial No. 68,071.

This invention relates to welding tools, and more particularly it relates to hand electric welding tools for welding metal strands.

The primary object of this invention is the provision of a hand electric welding tool for readily and efficiently welding fine wires.

In accordance with one embodiment of this invention, the above object is accomplished by providing a hand tool designed for welding and severing in one operation the free ends of fine wires, such as the lead-in wires of miniature switchboard lamps wherein the wires are guided substantially parallel to each other and firmly clamped between two electrodes prior to the completion of an electric circuit which extends between the electrodes through the wires and which is automatically opened due to the welding operation.

Specifically, this invention contemplates the provision of a pair of pivoted hand gripping members composed of non-conducting material, with an upper or normally movable member resiliently held in a retracted position. Insulated jaws are mounted on the free end of the members and are adapted to clamp a plurality of wires in engaging relationship and at separated points. One of the jaws comprises two laterally disposed electrodes insulated from each other and adapted to be connected to a source of electrical current by closing a switch carried by the movable member after the location of the wires in a welding position. Associated with one of the electrodes is an upwardly and outwardly extending arm adapted to guide the wires to be welded into V-shaped notches formed in the lower jaw ready for the welding operation.

The invention will be better understood by reference to the following detailed description, taken in connection with the accompanying drawings, in which—

Fig. 1 is a perspective view of one embodiment of this invention showing the application of the tool to the preferred use;

Fig. 2 is a vertical longitudinal sectional view thereof, a portion of the jaws being shown in elevation, and Fig. 3 is an enlarged fragmentary plan view of the lower jaw thereof.

Referring to the drawings in which like reference numerals designate similar parts throughout the various views, and particularly to Fig. 1 which shows the manner of applying the welding tool in the manufacture of miniature incandescent electric lamps, such as are sometimes used in telephone switch-boards, numeral 10 indicates a portion of a lamp bank exhausting tube of glass carrying upon vertically extending tubular glass arms 11 thereof a plurality of lamps 12. Lead-in wires of the lamps are indicated at 14 and extend downwardly from the point of connection of the lamps with the arms 11 of the tube 10. The wires 14 are generally composed of platinum and of very fine gauge and necessarily have to be handled with great care to prevent them from breaking at their point of entrance into the lamp. A plurality of the lamps are thus mounted in one of the steps, in one method of manufacture thereof, with the lead-in wires 14 of adjacent lamps connected in series.

The welding tool comprises upper and lower hand gripping members 17 and 18, respectively, composed of suitable non-conducting material and shaped for convenient holding in the hand of an operator, the members being pivotally attached together by a pair of spaced hinge plates 19 fixed to the lower member 18 and entered within suitable slots 20 (Fig. 2) formed in the upper member 17, a bolt indicated at 21 passing through the plates 19 and the upper member 17 forming the pivot upon which the latter member moves in the operation of the tool to be hereinafter described. A coiled compression spring 23 is positioned to opposite ends in pockets 24 formed in opposite faces of the members 17 and 18 to normally hold them in retracted position, as clearly shown in Fig. 2, while a suitably formed surface 25 upon the upper member engaging the upper face of the lower member limits the retraction of the members under the influence of the springs 23.

Upon the free or left end of the lower member 18, in slots 28 and 29 (Fig. 3) formed upon opposite sides thereof, is mounted a pair of electrodes 30 and 31. The electrodes 30 and 31 are insulated from each other and fixed to the member 18 by screws 32 passing through insulating washers and bushings 33 mounted in the electrode 31 through the openings provided in the member 18 and threaded into the opposite electrode 30, as clearly shown in Fig. 3. The free ends of the electrodes 30 and 31 are laterally spaced from each other and mounted in engagement with opposite faces thereof is a pair of contact members 34 and 35 with an insulating washer 36 filling the intervening space which in the present embodiment of the invention is approximately one thirty-second of an inch. A screw 37 passing through an insulating washer and bushing 38, the electrode 30, members 34 and 35 and washer 36 and threaded into the electrode 31 completes the assembly of the spaced electrodes forming the lower jaw of the tool. The insulating washer and bushing 38 serve to prevent current from passing between the electrodes by way of the screw 37.

The contact members 34 and 35 extend above the top surfaces of the electrodes 30 and 31, as clearly shown in Fig. 2, while the washer 36, clamped therebetween, extends only to the top of the electrodes, thereby leaving an open space of approximately one thirty-second of an inch between the opposed faces of the members 34 and 35 above the electrodes. Formed in each of the members 34 and 35 above the electrodes is a V-shaped notch 39 into which the wires to be welded are moved in the operation of the tool to be hereinafter described, the apex of the notch being elevated a very short distance above the top surface of the electrodes for a purpose which will be made apparent hereinafter. The contact member 34 at its left end is provided with an upwardly and outwardly extending arm 40, an inside angular surface 41 of which is a continuation of one side of the V-shaped notch formed in the member 34.

Secured to the upper gripping member 17 at the left end thereof in a manner similar to that of the electrodes 30 and 31 to the lower gripping member 18 is a pair of forwardly and downwardly extending fingers 42 and 43 which comprise the upper jaw. The extreme free ends of the fingers 42 and 43 are laterally spaced from each other a distance slightly in excess of the combined thickness of the contact members 34 and 35 and the washer 36 therebetween. When the upper gripping member 17 is moved downwardly in the operation of the tool, the inside surfaces of the fingers will slide freely upon the outside surfaces of the members 34 and 35 with lower surfaces 44 of the fingers moving into parallelism with the top surfaces of the electrodes as clearly shown in Fig. 1.

The contact members 34 and 35 of the electrodes 30 and 31 respectively may be included in a suitable circuit which in the present embodiment of the invention preferably is supplied with current from a six volt storage battery (not shown), the opposite poles of which are connected to flexible conductors 44 and 45. Carried in suitable openings formed in the lower gripping member 18 is a pair of connecting rods 46 and 47, preferably composed of brass, which at their outer projecting ends are suitably connected to the conductors 44 and 45 respectively. As clearly indicated in Fig. 3, the rod 47 is fixed to the member 18 and in electrical communication with the electrode 31 by a pair of screws 48 passing through the right end of the electrode and threaded into the rod 47, thereby completing a circuit connection from the battery (not shown) to the electrode 31. The electrode 30, as clearly shown in Figs. 2 and 3, is riveted to a pin 50 entered in a depression formed transversely in the member 18 and threaded into the latter and extending from the top to the bottom thereof (Fig. 2), and also threaded through the pin 50 is a screw 51 which at one end projects a short distance above the top of the member 18. Fixed to the top surface of the gripping member 18 and at the left end of the rod 46 by a pair of screws 52 is a leaf spring 53 provided upon its underside, at the free end thereof, with a contact member 54 which in its normal position, as shown in Fig. 2, is spaced from the upper end of the screw 51. The engagement of the contact 54 and the screw 51, it will readily be apparent completes a circuit connection from the battery (not shown) to the electrode 30.

The upper gripping member 17 is provided at its left end with a spring retracted knob 57 for causing the engagement of the contact 54 with the screw 51, and is so positioned as to be readily engaged by the thumb of the operator when the hand is grasping the tool. The knob 57 is composed of insulating material and in operation is limited in its downward movement by the lower end thereof engaging a shoulder 58 formed in an opening 59 and is locked to the member 17 by a head 60 formed upon a pin 61 fixed to the knob, the head engaging the under side of the member 17 when the knob is in its retracted position under the action of a compression spring 62 surrounding the pin 61, between the lower end of the knob 57 and a second shoulder 63 formed in the opening 59. The spring 62 is stronger than the spring 23, the purpose of which will be made apparent hereinafter.

In the operation of the hereinbefore described welding tool, the wires to be welded, which in the present instance are the miniature switchboard lamp lead-in wires 14 to be connected in series, may be grasped in the left hand of the operator between the forefinger and thumb and thereafter caught by the arm 40 of the tool grasped in the operator's right hand. It will be observed that the electrodes 30 and 31 (Fig. 3) and fingers 42 and 43 are angularly disposed relative to the end surfaces of the gripping members 17 and 18 to facilitate, in the present use of the tool, the engagement of the wires 14 with the arm 40. The upper gripping member 17 is then moved downwardly relative to the member 18 about the pivot 21 by exerting pressure with the thumb upon the knob 57, thereby causing the fingers 42 and 43 to engage the wires 14. In the continued downward movement of the member 17 the wires are guided and moved into the V-shaped notches 39 formed in the laterally spaced contact members 34 and 35 attached to the electrodes 30 and 31 respectively, the lower surfaces 44 of the fingers coming to rest against the top surfaces of the electrodes with the wires 14 clamped therebetween, as clearly shown in Fig. 1. Due to the elevation of the apex of each of the notches 39 above the top surface of the electrodes as hereinbefore described, the wires are securely clamped and drawn taut between the spaced contact members 34 and 35. Upon completion of the clamping of the wires as just described and substantially at the same instant the contact 54 is engaged with the screw 51 due to the flexing of the spring 62 by continued pressure exerted upon the knob 57. This causes an electric current of sufficient amplitude to flow through the bridged parallel wires 14 clamped between the spaced members 34 and 35 of the electrodes and thus causes them to be fused, completing the welding operation and simultaneously severing the free end portions of the wires extending beyond the weld from the remainder thereof, the welded wires appearing as indicated at 65 (Fig. 1).

The circuit may be traced as follows: from one pole of the battery (not shown) through the conductor 45, rod 47, screws 48, electrode 31, contact member 35, wires 14, to the opposite contact member 34, electrode 30, pin 50, screw 51, contact 54, spring 53, screws 52, connecting rod 46, conductor 44 and to the opposite pole of the battery. It will readily be apparent that upon completion of the welding operation, as just described, the circuit will automatically be opened by the break in the continuity of the wires 14 bridged between the members 34 and 35 during the welding operation without the operator releasing pressure upon the knob 57 to break the circuit between the contact 59 and screw 51.

From the foregoing description it will be seen that the tool described is of a simple construction and can be operated with but very little skill on the part of an operator.

Furthermore, by the use of the hereinbefore described tool, the operation of welding and severing the free ends of wires, such as those shown in connection with the particular application of the tool, may be expeditiously performed and without introducing deleterious strain on the wires.

What is claimed is:

1. A hand welding tool comprising a pair of spaced electrodes, means for bridging said electrodes with a plurality of metal strands engaging the electrodes at spaced points longitudinally along the strands, and means for causing electrical current to flow between said electrodes longitudinally through said strands for effecting a weld therebetween.

2. A hand welding tool comprising a pair of spaced electrodes, means for bridging said electrodes with a plurality of metal strands engaging the electrodes at spaced points longitudinally along the strands, means associated with said electrodes for locating the metal strands in a welding position, and means operated subsequently to the location of said strands for causing electrical current to flow between said electrodes longitudinally through said strands for effecting a weld therebetween.

3. A hand welding tool comprising a pair of hand gripping members, means for permitting the movement of said members to locate metal strands in a welding position, and electrical circuit connections completed upon the movement of said members to cause a current to flow through said strands for performing a weld and severing a portion thereof.

4. A hand tool for electric welding of metal strand comprising a plurality of oppositely disposed jaws for clamping a plurality of lengths of metal strand in adjacent relationship and at separated points, said jaws being electrically insulated from each other, and means for connecting one set of jaws to a source of electrical current to cause a flow of current therebetween to fuse and thereby sever the lengths between the separated points and weld the adjacent lengths.

5. A hand tool for electric welding of metal strand comprising a plurality of oppositely disposed jaws for clamping a plurality of lengths of metal strand in adjacent relationship and at separated points, said jaws being electrically insulated from each other, means carried by said jaws for moving the strands transversely into parallel adjacent relationship upon a relative movement of the jaws toward each other, and means for connecting one set of jaws to a source of electrical current to cause a flow of current therebetween to fuse and thereby sever the lengths between the separated points and weld the adjacent lengths.

6. A hand tool for electric welding of metal strand comprising a pair of oppositely disposed pivoted jaws for clamping a plurality of lengths of metal strand in adjacent relationship and at separated points, said jaws being electrically insulated from each other, one of said jaws comprising a pair of laterally spaced electrodes insulated from each other, and means for connecting said electrodes to a source of electrical current to cause a flow of current therebetween to fuse and thereby sever the lengths between the separated points and weld the adjacent lengths.

7. A hand tool for electric welding of metal strand comprising a pair of oppositely disposed sets of jaws for clamping a plurality of lengths of metal strand in adjacent relationship and at separated points, said jaws being electrically insulated from each other, means for connecting one set of jaws to a source of electrical current to cause a flow of current therebetween to fuse and thereby sever the lengths between the separated points and weld the adjacent lengths, said means including a switch associated with said one set of jaws, and means associated with the other set of jaws designed to be operated to close the switch to cause current to flow between said first mentioned set of jaws upon a relative movement of the two sets of jaws to clamp the strands.

8. A hand tool for electric welding of metal strand comprising a pair of oppositely disposed sets of jaws for clamping a plurality of lengths of metal strand in adjacent relationship and at separated points, said jaws being electrically insulated from each other, one of said sets of jaws comprising a pair of laterally spaced electrodes insulated from each other and having upwardly extending notched strand engaging faces, one of said faces extending above the others for initially engaging the strands, the other set of jaws comprising a pair of laterally spaced fingers designed to pass at either side of said electrodes upon relative movement of said jaws toward each other and guide the strands along the extended electrode face and into the notched faces of the electrodes, and means for connecting said electrodes to a source of electrical current to cause a flow of current therebetween to fuse and thereby sever the lengths between the spaced electrodes and weld the adjacent lengths.

In witness whereof, I hereunto subscribe my name this 24th day of October A. D., 1925.

GEORGE WILLIAM DUNCAN.